Figure 1:
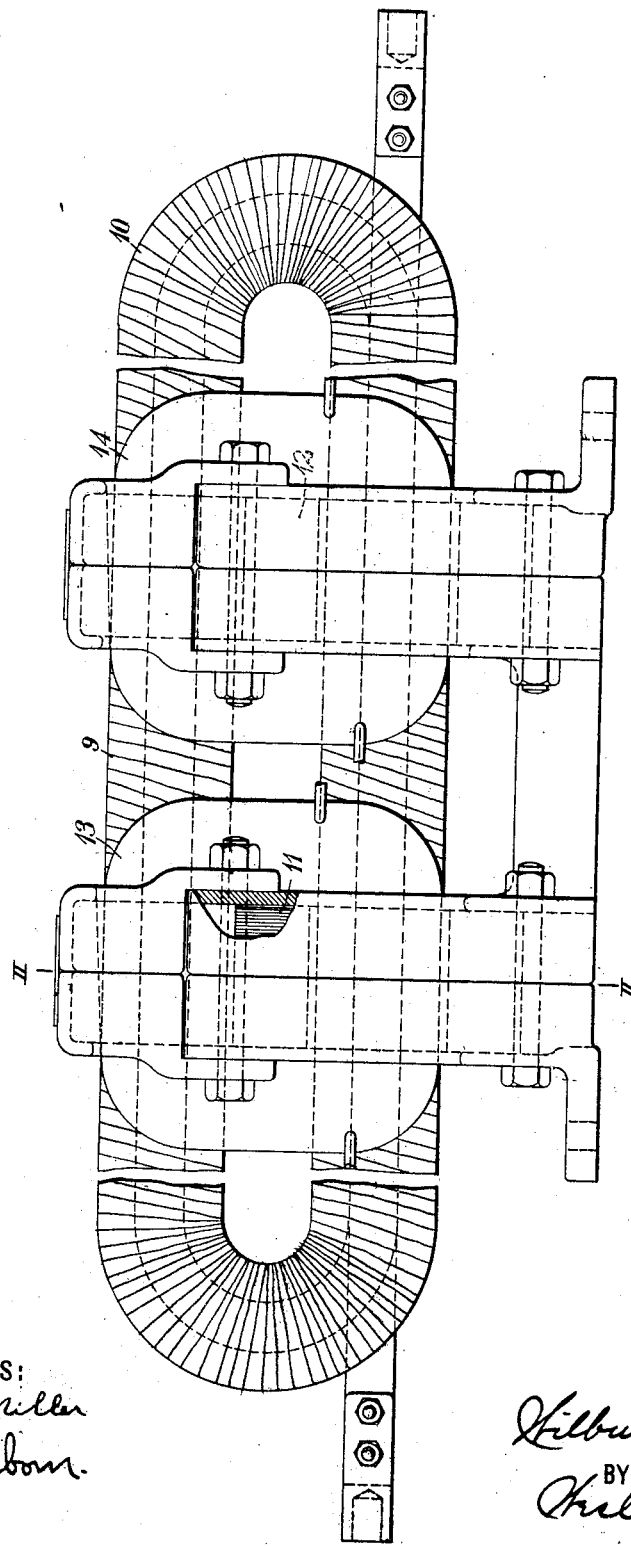

No. 854,316. PATENTED MAY 21, 1907.
W. H. THOMPSON.
ELECTRICAL APPARATUS.
APPLICATION FILED NOV. 23, 1906.

2 SHEETS—SHEET 1.

WITNESSES:
Fred H Miller
R J Dearborn

INVENTOR
Wilbur H. Thompson
BY
Riley J. Carr
ATTORNEY

No. 854,316. PATENTED MAY 21, 1907.
W. H. THOMPSON.
ELECTRICAL APPARATUS.
APPLICATION FILED NOV. 23, 1906.
2 SHEETS—SHEET 2.
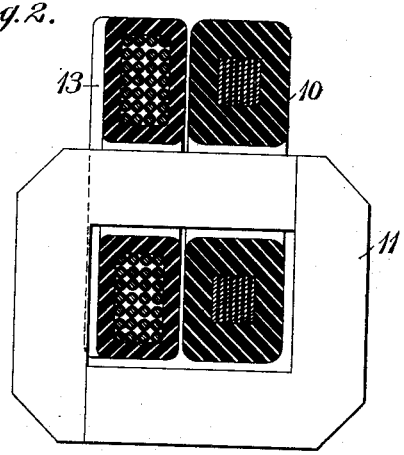
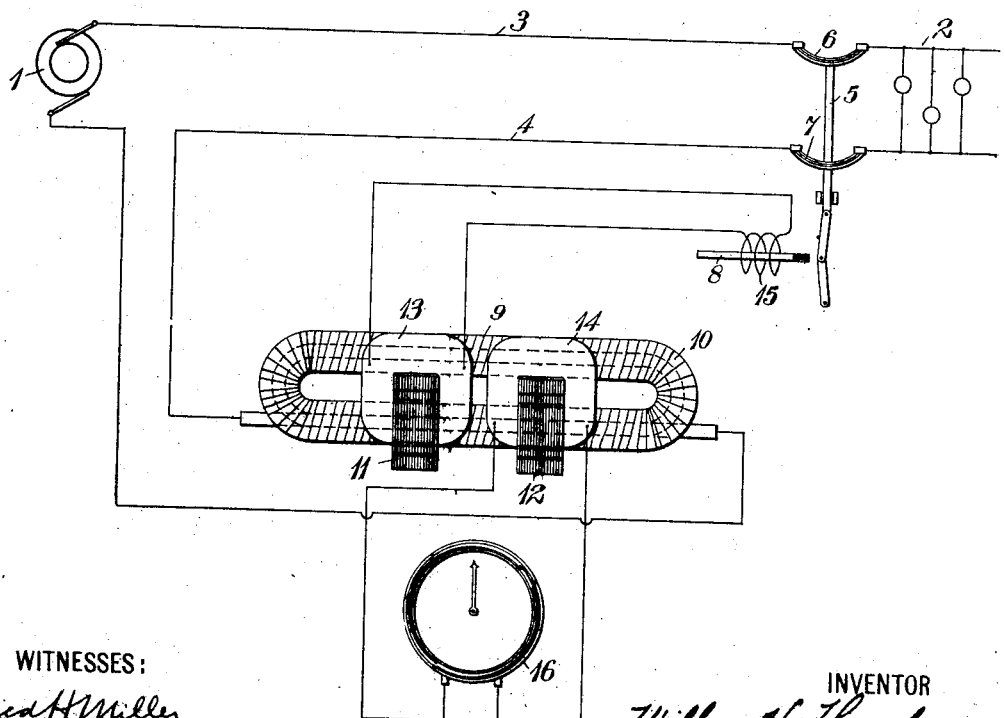

UNITED STATES PATENT OFFICE.

WILBUR H. THOMPSON, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL APPARATUS.

No. 854,316.    Specification of Letters Patent.    Patented May 21, 1907.

Application filed November 23, 1906. Serial No. 344,763.

*To all whom it may concern:*

Be it known that I, WILBUR H. THOMPSON, a citizen of the United States, and a resident of Wilkinsburg, in the county of Allegheny and State of Pennsylvania, have invented a new and useful Improvement in Electrical Apparatus, of which the following is a specification.

My invention relates to alternating current transformers, and it has for its object to provide a device of the aforesaid class that shall be adapted to supply energy to two or more translating devices at least one of which is relatively sensitive to electro-magnetic disturbances.

Heretofore when several translating devices have been supplied with energy from a single transformer they were usually either connected to a single secondary winding or severally connected to independent secondary windings which were interlinked by the same magnetic flux. If the operation of one or more devices so connected is intermittent or such that electro-magnetic disturbances obtain in the transformer, it is observed that the operation of the other more sensitive translating devices is irregular.

According to my invention, I entirely avoid the aforesaid irregularities and disturbances by providing independent magnetizable cores which are energized by a single primary winding and each of which may be provided with one or more secondary windings.

Figures 1 and 2 of the accompanying drawings, are, respectively, a front view and a sectional elevation of a transformer constructed in accordance with my invention, and Fig. 3 is a diagrammatic view of a system of distribution embodying my invention.

Referring to the drawings, alternating current electric energy may be supplied from any convenient source, such as the generator 1, to a plurality of translating devices 2, through a distributing circuit 3—4. If the energy supplied to the translating devices exceeds a predetermined amount, an automatic circuit-breaker 5, comprising bridging contact members 6 and 7 and an overload release magnet 8, will interrupt the circuit.

A transformer 9 of special construction, comprising a primary coil 10, independent magnetizable core members 11 and 12 and secondary coils 13 and 14, is connected in the interrupted line 4. The release magnet 8 of the circuit interrupter 5 is provided with an operating coil 15 which is energized from the secondary coil 13. An ammeter or other electrical instrument 16 is energized from the secondary coil 14.

By this arrangement, the electrical measuring instrument, which is relatively sensitive to electro-magnetic disturbances, is entirely independent of the character of the load on the coil 13, since the two coils are influenced by separate core members.

Although the transformer of my invention is illustrated in connection with a circuit interrupter and a measuring instrument, two independent core members being provided for this purpose, its use is not restricted thereto and it will be readily understood that a greater number of independent core members having one or more secondary coils may be employed within the scope of my invention.

I claim as my invention:

1. A transformer comprising a primary coil, a plurality of independent core members and secondary windings that are severally influenced by said core members.

2. A transformer comprising a main coil, a plurality of secondary coils, and independent magnetizable core members whereby the secondary coils are severally and magnetically interlinked with the main coil.

3. The combination with an electric circuit, a primary coil connected in series therewith, a plurality of independent cores which are magnetized by said coil, of a plurality of secondary windings which are magnetically interlinked with the primary coil by the independent cores.

4. The combination with an electric circuit, an interrupter therefor and a transformer coil connected in series therewith, of independent magnetizable cores surrounding said coil, secondary coils magnetically interlinked by said series coil, means for actuating the interrupter, said means being energized from one of said secondary coils, and another electrical apparatus which is relatively sensitive to electro-magnetic disturbances and is connected to another of said secondary coils.

5. The combination with an electric circuit, an automatic interrupter, and an electrical measuring instrument, of a transformer comprising a primary coil connected in series with said circuit, a pair of independent core members, and secondary coils severally influenced thereby, said automatic interrupter being energized from one of the secondary coils and the measuring instrument being energized from the other secondary coil.

In testimony whereof, I have hereunto subscribed my name this 20th day of November, 1906.

W. H. THOMPSON.

Witnesses:
HERBERT FABER,
BIRNEY HINES.